INVENTOR
CHARLES H. BAECHLE

BY Ralph W. Kalish

ATTORNEY

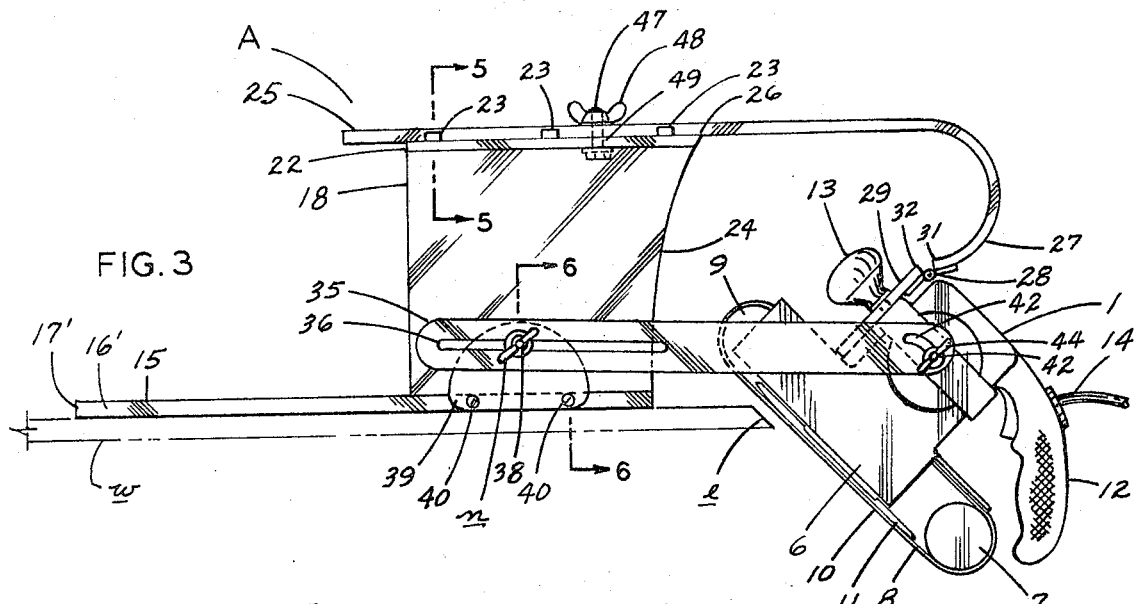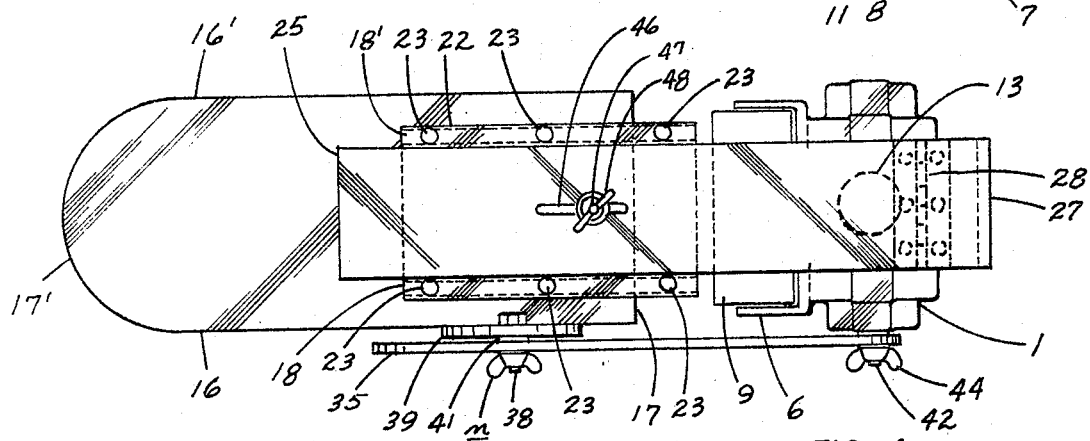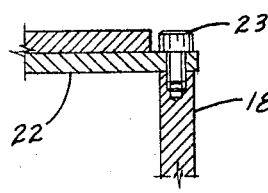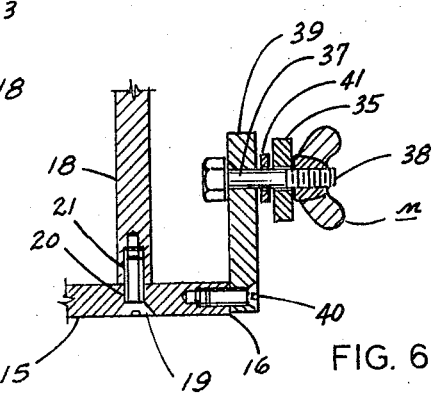
FIG. 3
FIG. 4
FIG. 5
FIG. 6
INVENTOR
CHARLES H. BAECHLE
BY Ralph W. Kalish
ATTORNEY United States Patent Office 3,664,614
Patented May 23, 1972

3,664,614
POWER TOOL ACCESSORY
Charles H. Baechle, 7701 Telegraph Road,
St. Louis County, Mo. 63129
Filed Nov. 26, 1969, Ser. No. 880,289
Int. Cl. F16m 11/00
U.S. Cl. 248—2
10 Claims

ABSTRACT OF THE DISCLOSURE

An accessory for a portable power tool, such as a sander, for supporting same with relation to the work and for presenting same at the preselected angle thereto, said accessory comprising a base plate for disposition upon the upper surface of the work, an arm adjustable longitudinally of said accessory and having a handle, a leg pivotally mounted on said handle and being engageable to said tool whereby a tool may be swung with relationship to the work and a bar for maintaining said tool in selected position.

BACKGROUND AND SUMMARY OF THE INVENTION

This invention relates to portable power-operated tools and, more particularly, to an accessory for use therewith.

It is an object of the present invention to provide an accessory for a power tool which is adapted for securement to said tool and having means for maintaining the tool in predetermined disposition to the work to be treated.

It is another object of the present invention to provide an accessory of the type stated which incorporates adjusting means for accommodating tools of various size and having means for maintaining the related tool in preselected position so that the operator is relieved of the necessity of manipulating the tool during usage.

It is a further object of the present invention to provide an accessory of the type stated which is adapted for facile engagement to and disengagement from the related tool and which provides a stabilizing structure for the tool during usage so as to obviate the development of imperfections in the work as has been heretofore accepted with hand operated tools.

It is a still further object of the present invention to provide an accessory of the type stated which is economical in manufacture; which incorporates a simplicity of parts so as to be resistant to breakdown; which is sturdy in construction; which is readily usable by relatively unskilled individuals; and which is reliable and durable in usage.

BRIEF DESCRIPTION OF THE DRAWINGS

FIG. 3 is a side elevational view of the power tool accessory illustrating the same engaged to a sander and with the latter being presented in inclined relationship to the vertical.

FIG. 4 is a top plan view.

FIG. 5 is a vertical transverse sectional view taken on the line 5—5 of FIG. 3.

FIG. 6 is a vertical transverse sectional view taken on the line 6—6 of FIG. 3.

DESCRIPTION OF THE PREFERRED EMBODIMENT

Figure 1:
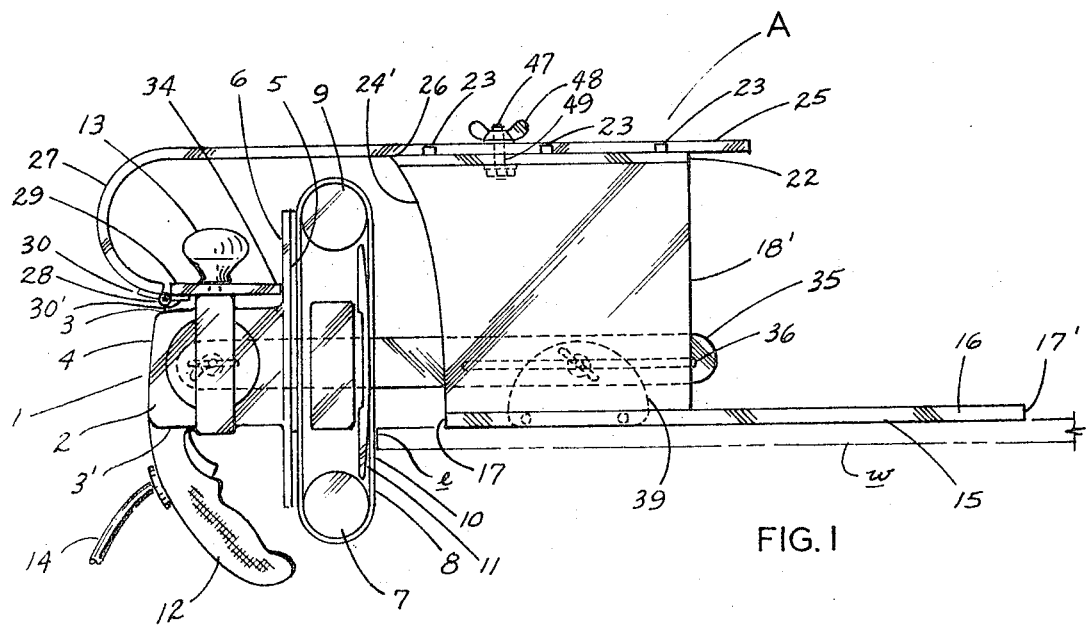
FIG. 1 is a side elevational view of the power tool accessory constructed in accordance with and embodying the present invention illustrating the same engaged to a sander with the latter in vertical position.

Referring now by reference characters to the drawings which illustrate the preferred embodiment of the present invention, 1 generally designates a portable power-operated sander, which sander is presented as exemplary of a power tool for utilization with the accessory indicated at A and to be described more fully hereinbelow. Power sander 1 is of conventional character having a housing 2 for a motor (not shown); said housing having opposed side walls 3, 3', a normally top wall 4, a base wall 5 integral with a belt guard plate 6 planarwise parallel to top wall 4. The motor drive shaft (not shown) is suitably connected by transmission means (not shown) for driving a drive roller 7 about which is trained one end portion of an endless belt 8, the opposite end portion of which extends about an idler roller 9. Belt 8 is of the usual abrasive type having a preselected coarseness. The working, or outer, course 10 of belt 8 is stabilized in its central portion by the customary backing plate 11, said latter being located between rollers 7, 9. Projecting from side wall 3' of housing 2 is a handle or grip 12, as of the pistol type, for facilitating manipulation of sander 1. Provided on the opposite side wall 3 of housing 2 is a knob 13 for promoting stabilizing control of sander 1 which may be threadedly engaged upon a stud (not shown) extending from housing 2. The motor may be connected to a convenient source of power by a conventional conductor 14.

Provided for engagement to sander 1 is the aforesaid accessory A which comprises a flat base plate 15 having parallel, longitudinal edges 16, 16', inner and outer end edges 17, 17'; the former being preferably normal to side edges 16, 16' and the latter being of any desired contour, such as, arcuate. Fixed on base plate 15 and extending upwardly therefrom is a pair of parallel, spaced-apart side plates 18, 18' which are located on the normally inward portion of base plate 15, spacedly inwardly of the adjacent side margin 16, 16', respectively, and equidistant from the longitudinal axis of the said base plate 15. Each of said side plates 18, 18' are fixed to base plate 15 by means of a plurality of countersunk screws 19 threadedly engaged within aligned, tapped openings 20, 21 in base plate 15 and the related side plate 18, 18' (FIG. 6). At their upper ends side plates 18, 18' are connected to a top plate 22, as by means of short bolts 23, whereby the said side plates 18, 18' are integrated into a stable support structure. On their margins directed toward inner margin 17 of base plate 15 said side plates 18, 18' are of generally concave sonfiguration, as indicated at 24, 24', for purposes disclosed hereinbelow. The upper portions of the inner margins of said side walls 18, 18' may project beyond the proximate end margin of base plate 15.

Disposed upon top wall 22 is the free end portion of a relatively narrow adjustment arm 25, being formed from relatively heavy gauge flat stock and which extends beyond the inner end edge, as at 26 of top wall 22, a predetermined point whereat the same is turned back upon itself in a curvate manner to develop a handle 27. Pivotally connected to the end margin of handle 27, as by a hinge 28, is a mounting leg 29; said hinge 28 having leafs 30, 30', respectively, secured to the adjacent, outwardly directed end portions of handle 27 and mounting leg 29 with the customary intervening knuckles and pintle 31, 32, respectively, whereby said mounting leg 29 is swingable from a position wherein it is planarwise parallel to the opposed portion of adjustment arm 25 and base plate 15 (see FIGS. 1 and 2), in which position the proximate edges of said leg 29 and handle 27 are in abutment, and in downwardly swung position (see FIG. 3) wherein said leg inclines toward base plate 15. With respect to FIGS.

1 and 2, it will be seen that the arc of handle 27 is of such extent so as to present leg 29 normally upwardly of base plate 15 and longitudinally align with the spacing intervening side plates 18, 18'. Leg 29 on its outer face, remote from adjustment arm 25, is adapted for disposition against side wall 3 of housing 2 of sander 1; said leg 29 having an aperture 33 for extension therethrough of the mounting stud so that knob 13 will thus be used to tightly secure said leg 29 against housing wall 3, as well as to present said knob proximate the bight of handle 27 for convenience. Leg 29 as used with sander 1 is of such length that its free end margin, as at 34, will abut against the proximate portion of belt guard plate 6 and further assuring stabilization of sander 1 in engaged relationship to accessory A. Accordingly, it will be seen that with sander 1 so secured, the same will be rockable through an angle in the upper limit of which abrasive belt 8 will be planarwise normal to the base plate 15 (FIGS. 1 and 2) and in the lower portions of which said belt will be disposed at a relatively reduced acute angle with relation to said base plate 15 (FIG. 3).

In order to maintain sander 1 in preselected position with respect to base plate 15, there is provided a tie bar 35 for effectively connecting sander 1 and accessory A. At its end remote from sander 1, tie bar 35 is provided with an elongated slot 36 for extension therethrough of the stem 37 of a bolt 38 which is suitably fixed in a lug 39 secured as by a screw 40 to edge 16 of base plate 15 proximate the inner end thereof. Bolt 38 projects beyond tie bar 35 for threadedly receiving a wing nut n; there being a washer 41 between lug 39 and tie bar 35 so that upon tightening of wing nut 40 the relative positionment of tie bar 35 with respect to lug 39 may be reliably effected.

In its opposite end portion, tie bar 35 is provided with an arcuate slot 42 for extension therethrough of a bolt 43 fixed in housing 2 and extending from side wall 3 thereof. At its outer end, bolt 43 threadedly receives a wing nut 44 for securing said bolt 43 in its preselected relative position within slot 42.

As indicated above, adjustment arm 25 is movable axially of top plate 22 by means of a slot 46 formed in said arm 25 for extension therethrough of bolt 47, the upper threaded end of which is engageable by a wing nut 48 and the lower end of which is suitably fixed within an opening 49 provided in top plate 22. Thus, adjustment arm 25 may be positioned relative to top plate 22 after loosening of wing nut 48; and then upon retightening of the same said arm is secured in selected position for the purpose of accommodating the particular tool, such as, sander 1, for regulating the disposition of the same relative to the edge or like surface to be worked.

Figure 2:
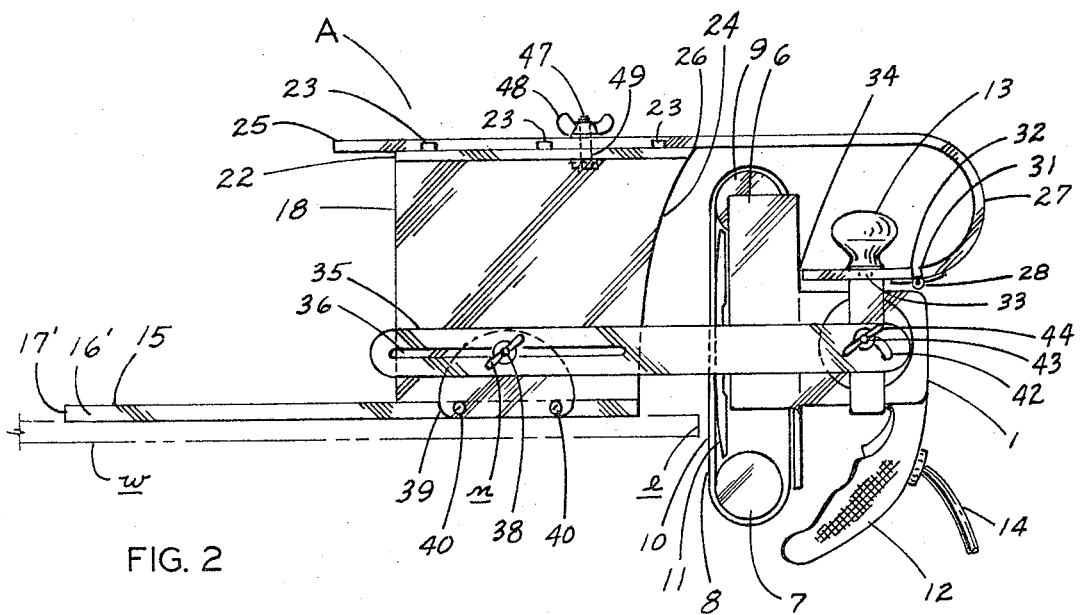
FIG. 2 is a side elevational view of the opposite side of the power tool accessory from that shown in FIG. 1.

In view of the foregoing, it is believed that the operation of the present invention is self-evident. Base plate 15 is disposed flatwise upon the upper surface of the work w, and provides a stabilizing force with relatively great area for forming a firm support. The upper surface thereof, beyond side walls 18, 18' will receive one of the operator's hands which is disposed restingly thereon but with the application of some pressure to avoid any inadvertent tilting. The operator's other hand will grasp handle 27 for guiding; directing; or rigidifying purposes. The edge to be treated is, as indicated at e in FIGS. 1, 2 and 3, presented for operation thereon by the working course 10 of sander 1. If such edge e is to be finished at an angle of 90° to the top surface of the work, sander 1 will, understandably, be presented so that course 10 is within a plane normal to such edge e, as shown in FIGS. 1 and 2. Thus, in this position leg 29 will be, as shown above, planarwise parallel to arm 25 and base plate 15 and with hinge 28 in closed condition, as it were, that is, with the confronting margins of handle 27 and leg 29 being in abutment. Tie bar 35 is also in commensurately adjusted position.

If it is desired to provide a baffle upon edge e, as shown in FIG. 3, wing nuts n and 44 are loosened, leg 29 is swung downwardly with appropriate opening of hinge 28 until course 10 of sander 1 is at the requisite angle. Thereupon, wing nuts n and 44 are tightened so as to secure tie bar 35 in the proper position for assuring maintenance of sander 1 at the selected angle. It is to be especially noted that the relationship of sander 1 and accessory A is such that edge e will confront only the portion of course 10 which is reinforced by backing plate 11.

Furthermore, the concavity 24 of the rearward edges of side plates 18, 18' permits of unrestricted rocking of sander 1 into selected position within the prescribed range.

By use of the present invention, a finish of requisite angle will be accorded the treated surface in a consistent and reliable manner thereby obviating the heretofore accepted need of the operator attempting to develop such angle by free hand with attendant imperfections. Accessory A, in effect, transforms a hand-controlled power tool into substantially the equivalent of a machine tool as a stabilization is brought about which has not been currently considered in connection with portable tools.

It is obvious that accessory A is readily adapted with various types of power tools and that the same need not be substantially modified for use with said accessory.

Having thus described my invention, what I claim and desire to obtain by Letters Patent is:

1. For use with a power tool for positioning same with respect to the work, an accessory comprising a base plate, a support member disposed upon said base plate, an arm adjustably mounted upon said support for relative movement with respect to the base plate, said arm extending beyond said support and beyond said base plate, means attaching said tool to the arm in the portion thereof extending beyond said support and said base plate for disposition in spaced relationship thereto.

2. For use with a power tool for positioning same with respect to the work, an accessory as defined in claim 1 and further characterized by a handle provided on said arm remote from said base plate, and said means attaching said arm comprising a leg swingable with respect to said handle.

3. For use with a power tool for positioning same with respect to the work, an accessory as defined in claim 2 and further characterized by pivot means hingedly interconnecting said handle and said leg whereby the latter is swingable through a predetermined arc, said leg being attached to the tool.

4. For use with a power tool for positioning with respect to the work, an accessory comprising a base plate, an arm, means adjustably supporting said arm for relative movement with respect to the base plate, a handle provided on said arm remote from said base plate, a leg pivot means hingedly interconnecting said handle and said leg whereby the latter is swingable through a predetermined arc with respect to said handle, means attaching said leg to the tool, and means interconnecting said tool and said accessory at a point remote from said leg.

5. For use with a power tool for positioning same with respect to the work, an accessory as defined in claim 4 and further characterized by said leg determining spacedly from the proximate position of said base plate for disposition therebetween of the operating portion of the tool, and a bar attached for connection at one end to said tool proximate said leg and at its other end to said accessory upwardly of said base plate, said bar extending across the spacing between said leg and said base plate.

6. For use with a power tool for positioning same with respect to the work, an accessory as defined in claim 5 and further characterized by means for maintaining said bar in effected extended or retracted position for stabilizing the tool in selected disposition.

7. For use with a power tool for positioning same with respect to the work, an accessory as defined in claim 4 and further characterized by said means interconnecting said tool and said accessory being a bar engaged at one end to said tool proximate said leg and at its other end to said accessory.

8. For use with a power tool for positioning same with respect to an edge of a flat work piece, an accessory comprising a base plate for flatwise disposition upon the work piece and located inwardly of the edge to be treated, a support member disposed on said plate for extension upwardly thereof, an arm, means adjustably mounting said arm upon said support member for relative movement of the same with respect to the base plate, said arm projecting beyond said support and said base plate for presentation spacedly beyond the edge of the work piece to be treated, means attaching said projecting portion of said arm to the tool for disposing same beyond said support and said base plate to present same to the edge of the work piece to be treated.

9. For use with a power tool for positioning same with respect to the work, an accessory comprising a base plate, a support member disposed upon said base plate, an arm adjustably mounted upon said support for relative movement with respect to the base plate, means attaching said arm to the tool, a bar engaged at one end to said tool and at its other end to said support member, and means for engaging said bar other end to said accessory to permit said bar to be axially movable.

10. For use with a power tool for positioning same with respect to the work, an accessory comprising a base plate, a support member disposed upon said base plate, an arm adjustably mounted on the upper end of said support member and being extensible therefrom to a point beyond the proximate portion of the base plate, a handle provided on said arm in its extended portion, means attaching said arm handle to the tool to present same spacedly from said support member, and adjustable means interconnecting said tool and said support member to permit optional positioning of said tool toward and away from said supoprt member commensurate with adjustment of said arm.

References Cited
UNITED STATES PATENTS

| | | | |
|---|---|---|---|
| 1,828,043 | 10/1931 | Hedgpeth | 143—43 A |
| 2,702,569 | 2/1955 | Yelle | 143—43 A |
| 2,630,151 | 3/1953 | Turnbull | 143—43 A |

J. FRANKLIN FOSS, Primary Examiner

U.S. Cl. X.R.

51—170 PT; 143—43 A; 248—13